United States Patent
Heirung et al.

(10) Patent No.: US 12,084,048 B2
(45) Date of Patent: Sep. 10, 2024

(54) PHYSICAL FEEDBACK CONFIRMATION FROM ASSISTED- DRIVING SYSTEM ABOUT TRAFFIC EVENT

(71) Applicant: Atieva, Inc., Newark, CA (US)

(72) Inventors: Tor Aksel Notland Heirung, San Francisco, CA (US); Sumukha Mysore Harish, Milpitas, CA (US); Jinwoo Lee, Fremont, CA (US)

(73) Assignee: Atieva, Inc., Newark, CA (US)

( * ) Notice: Subject to any disclaimer, the term of this patent is extended or adjusted under 35 U.S.C. 154(b) by 361 days.

(21) Appl. No.: 17/248,977

(22) Filed: Feb. 16, 2021

(65) Prior Publication Data
US 2022/0258728 A1    Aug. 18, 2022

(51) Int. Cl.
*B60W 30/09*    (2012.01)
*B60W 40/04*    (2006.01)
*B60W 50/16*    (2020.01)

(52) U.S. Cl.
CPC .......... *B60W 30/09* (2013.01); *B60W 40/04* (2013.01); *B60W 50/16* (2013.01); *B60W 2420/403* (2013.01); *B60W 2420/408* (2024.01); *B60W 2420/54* (2013.01)

(58) Field of Classification Search
CPC ...... B60W 30/09; B60W 40/04; B60W 50/16; B60W 2420/42; B60W 2420/52; B60W 2420/54
See application file for complete search history.

(56) References Cited

U.S. PATENT DOCUMENTS

| | | | |
|---|---|---|---|
| 10,037,865 B2 | 7/2018 | Al-Fandi et al. | |
| 10,427,655 B2 * | 10/2019 | Nix | ............... B60T 7/12 |
| 2015/0006028 A1 | 1/2015 | Strauss | |
| 2015/0148985 A1 * | 5/2015 | Jo | ........... B60W 30/095 701/1 |
| 2015/0151725 A1 | 6/2015 | Clarke et al. | |
| 2015/0166058 A1 * | 6/2015 | Mizutani | .......... B60K 35/00 701/1 |

(Continued)

FOREIGN PATENT DOCUMENTS

| WO | WO-2008020071 A2 * | 2/2008 | ........ B60R 21/0134 |
|---|---|---|---|
| WO | 2018232242 A1 | 12/2018 | |
| WO | 2019086518 A1 | 5/2019 | |

OTHER PUBLICATIONS

Y. Gaffary et al.: "The Use of Haptic and Tactile Information in the Car to Improve Driving Safety: A Review of Current Technologies," Frontiers in ICT, vol. 5, Article 5, Mar. 26, 2018, 11 pages.

(Continued)

*Primary Examiner* — Peter D Nolan
*Assistant Examiner* — Demetra R Smith-Stewart
(74) *Attorney, Agent, or Firm* — Brake Hughes Bellermann LLP

(57) ABSTRACT

A computer-implemented method comprises: detecting, by an assisted-driving system that is currently controlling motion of a first vehicle, a traffic event external to the first vehicle; and providing, by the assisted-driving system and in response to detecting the traffic event, confirmation to a passenger in the first vehicle that the assisted-driving system is handling the traffic event, the confirmation including a physical feedback perceptible to the passenger.

20 Claims, 13 Drawing Sheets

(56) References Cited

U.S. PATENT DOCUMENTS

| | | | |
|---|---|---|---|
| 2015/0210216 A1* | 7/2015 | Reichel | B60W 30/09 |
| | | | 701/99 |
| 2017/0113664 A1* | 4/2017 | Nix | G06V 20/56 |
| 2017/0267254 A1 | 9/2017 | Leppanen et al. | |
| 2017/0291540 A1 | 10/2017 | Caveney et al. | |
| 2018/0162186 A1 | 6/2018 | Anderson et al. | |
| 2018/0319380 A1* | 11/2018 | Laine | B60W 10/184 |
| 2019/0250623 A1 | 8/2019 | Kentley-Klay et al. | |
| 2020/0139992 A1* | 5/2020 | Oba | B60W 10/20 |
| 2021/0179094 A1* | 6/2021 | Newman | B60W 10/184 |
| 2021/0188256 A1 | 6/2021 | Hoedt et al. | |

OTHER PUBLICATIONS

S. Tsugawa: "Trends and Issues in Safe Driver Assistance Systens— Driver Acceptance and Assistance for Elderly Drivers," IATSS Research, vol. 30, No. 2, Jul. 4, 2006, pp. 6-18.

International Search Report and Written Opinion for PCT Application No. PCT/US2022/070679, mailed on May 24, 2022, 8 pages.

* cited by examiner

PHYSICAL FEEDBACK CONFIRMATION FROM ASSISTED- DRIVING SYSTEM ABOUT TRAFFIC EVENT

TECHNICAL FIELD

This document relates to a physical feedback confirmation from an assisted-driving system.

BACKGROUND

Some vehicles manufactured nowadays are equipped with one or more types of systems that can at least in part handle operations relating to the driving of the vehicle. The level of driving autonomy provided can vary between such systems to a significant extent. Some existing systems provide audio or visual communications regarding the operation of the system and/or the occurrence of events detected thereby. However, such approaches can be associated with one or more drawbacks. For example, a sound such as an alarm can be ambiguous; a verbal announcement can take too long to be played out and may require further time for a person to process the message; and visual cues presented (e.g., on a screen) can be difficult to perceive and subject to not being noticed.

SUMMARY

In a first aspect, a computer-implemented method comprises: detecting, by an assisted-driving system that is currently controlling motion of a first vehicle, a traffic event external to the first vehicle; and providing, by the assisted-driving system and in response to detecting the traffic event, confirmation to a passenger in the first vehicle that the assisted-driving system is handling the traffic event, the confirmation including a physical feedback perceptible to the passenger.

Implementations can include any or all of the following features. The computer-implemented method further comprises performing, by the assisted-driving system, an action that is triggered by the detection of the traffic event, the action performed after providing the confirmation. The action comprises at least one of braking the first vehicle or changing a steering angle of the first vehicle. The physical feedback comprises a first braking action with regard to the first vehicle. The assisted-driving system does not plan a subsequent action in response to detecting the traffic event. The assisted-driving system plans a second braking action in response to detecting the traffic event, and wherein the first braking action precedes the second braking action. The second braking action is defined for the assisted-driving system to handle the traffic event also without the first braking action being performed, and wherein the first braking action is stronger than the second braking action. A first velocity of the first vehicle according to the first braking action being performed eventually equals a second velocity of the first vehicle according to the second braking action being performed. After the first and second velocities are equal, the first velocity subsequently is greater than the second velocity. After the first velocity is greater than the second velocity, the first and second velocities eventually become equal again. The physical feedback comprises a first change of steering angle with regard to the first vehicle. The physical feedback further comprises a second change of steering angle performed immediately after the first change of steering angle, the second change of steering angle substantially opposite to the first change of steering angle. The assisted-driving system plans a second change of steering angle in response to detecting the traffic event, and wherein the first change of steering angle precedes, and is greater than, the second change of steering angle. A first lateral offset corresponding to the first change of steering angle eventually equals a second lateral offset corresponding to the second change of steering angle. The physical feedback comprises increasing a seat belt tension for the passenger. The physical feedback comprises moving a seat for the passenger in the first vehicle. The traffic event comprises an object being positioned in a path of the first vehicle, or a second vehicle entering the path of the first vehicle.

In a second aspect, a computer program product is tangibly embodied in a non-transitory storage medium, the computer program product including instructions that when executed cause a processor to perform operations, the operations comprising: detecting, by an assisted-driving system that is currently controlling motion of a first vehicle, a traffic event external to the first vehicle; and providing, by the assisted-driving system and in response to detecting the traffic event, confirmation to a passenger in the first vehicle that the assisted-driving system is handling the traffic event, the confirmation including a physical feedback perceptible to the passenger.

In a third aspect, an assisted-driving system for a vehicle comprises: first means for detecting, while the assisted-driving system is controlling motion of the vehicle, a traffic event external to the vehicle; and second means for providing, in response to the first means detecting the traffic event, confirmation to a passenger in the vehicle that the assisted-driving system is handling the traffic event, the confirmation including a physical feedback perceptible to the passenger.

Implementations can include any or all of the following features. The first means comprises at least one of a radar, lidar, camera, or an ultrasonic sensor, and the second means comprises at least one of a steering system of the vehicle, a brake system of the vehicle, a seat belt tensioner of the vehicle, or a seat motor of the vehicle.

BRIEF DESCRIPTION OF DRAWINGS

Like reference symbols in the various drawings indicate like elements.

DETAILED DESCRIPTION

Figure 1A:
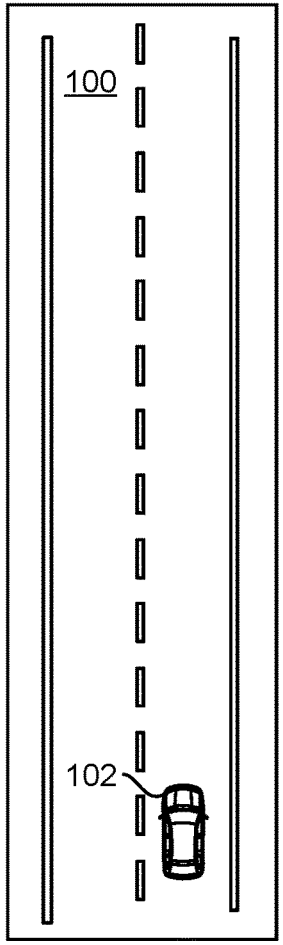
FIGS. 1A-1C show examples relating to confirming that an assisted-driving system will handle a detected traffic event relating to a vehicle ahead of an ego vehicle.

This document describes examples of systems and techniques providing physical feedback for communicating to a user both the detection of an obstacle or other event and the intent to react, by an autonomous-driving system, an advanced driving-assistance system (ADAS) or other assisted-driving (AD) system. An implementation can communicate, through physical force, to a user in a vehicle that the ADAS/AD software has detected an obstacle, and that the system intends to respond in a safe manner.

An autonomous driving (e.g., AD/ADAS) system should communicate to users its awareness of the surroundings and its ability to ensure safety. Implementations described herein use one or more actuators to generate physical force that serves as an intuitive way of communicating to the user that the ADAS/AD system has detected and will safely react to an obstacle. In some implementations, this can involve the detection of a vehicle cutting in in front of the ego vehicle on which the system is operating. For example, the system could adjust the velocity in a manner that resembles "lightly tapping the brakes" as a clear signal of having detected the vehicle cutting in, as well as communicating the intention to ensure the relative distance between the vehicles does not get uncomfortably small. Another example is when a vehicle swerves (e.g., undergoes lateral motion) in a manner that reduces its lateral distance to the ego vehicle to the extent that a user may perceive a risk of collision. For example, the system can quickly adjust the road-wheel angle in a spike-like manner to produce a small but rapid increase in the lateral distance between the two vehicles. These forms of notification are relatively unambiguous to the user, for example in contrast to audio- or visual-based notifications, such as a sound, a spoken-word explanation, an indicator light, or a notification displayed on a screen. These notifications can serve to create an immediate sense of trust in the ADAS/AD system, both in the immediate term and in the long term.

Some implementations described herein use physical force to notify the user in an intuitive, immediate, and unambiguous manner. The physical force can arise from one or more actuators used to control the vehicle's motion (such as the motor, the brakes, and/or the steering wheel/column), from motors built into the seats, from a tug on the seat belt, or from other sources of physical force.

In some implementations, the physical feedback can emulate the effect of a driver's response to the environment. In some implementations, the behavior of an ADAS/AS system in notifying a passenger through an immediate or sudden response, can make the system's operation seem closer to the human driver's response, thereby increasing trust in the system. For example, a relatively gentle braking by the ADAS/AD system (e.g., analogous to a tap on the brakes) can directly correspond to the most likely reaction that a driver might have when suddenly noticing an obstacle or similar traffic event. As another example, a relatively gentle steering maneuver by the ADAS/AD system (e.g., analogous to a slight turning of the steering wheel) can directly correspond to the most likely reaction that a driver might have when the vehicle is suddenly approached laterally. The latter example can provide dual aspects of confirmation: both visually in the movement of the steering wheel and physically in terms of a lateral jerk perceivable to the person. Other ways of generating physical feedback can be used, including, but not limited to, by actuation of seat belt motors (e.g., in a seat belt pretension system), or seat motors, or the powertrain motor(s) of the vehicle.

Implementations described herein can allow an ADAS/AD system to clearly, quickly, and unambiguously communicate to any user (whether in the driver's seat in vehicles that have one, or in a passenger seat) that the system has detected an obstacle that can be perceived as posing a risk or threat to safety, and that the system has taken or will take action as a safe response to the obstacle. This can increase trust in the system by users and enhances the experience of riding in and using the vehicle.

One of the primary goals and quality metrics of an ADAS/AD systems is to plan and execute safe and comfortable motion in response to the environment. A typical motion may be planned to minimize both lateral and longitudinal jerk (the time derivative of acceleration), along with other metrics. Minimizing jerk can be thought of as planning for motion that feels as smooth as possible. While smooth motion generally correlates with user comfort, there are situations where minimally jerky motion in response to an obstacle can give the user the impression that the ADAS/AD system has not perceived the obstacle and is therefore not reacting to it. Although the ADAS/AD system may have planned, and be in the process of executing, a safe and comfortable motion response to possible threat posed by the obstacle, this motion may be different from how a human driver would respond and thus does not necessarily give the user confidence that ADAS/AD system is ensuring the user's safety. The ADAS/AD system can communicate its awareness of an obstacle through the classic modes of human-machine interaction, such as visual cues (illustration on a display or a warning light, for example) or audio notifications (an alarm-like ping or a spoken announcement, for example). However, these types of notifications may have issues including, but not limited to, ambiguity (such as an alarm-like ping), or slow human processing (such as hearing the end of a spoken notification, or interpreting a visual explanation).

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples herein, any person carried by a vehicle can be referred to as a "passenger" of the vehicle, regardless whether the person is driving the vehicle, or whether the person has access to controls for driving the vehicle, or whether the person lacks controls for driving the vehicle. In examples herein, the vehicle that is the subject of the example is sometimes referred to as the "ego vehicle".

One or more other vehicles are sometimes referred to as a "target vehicle". Multiple vehicles in the present examples are illustrated as being similar or identical to each other for illustrative purposes only.

Examples herein refer to assisted driving (e.g., as performed by an AD system). Assisted driving involves at least partially automating one or more dynamic driving tasks. An ADAS can perform assisted driving and is an example of an assisted-driving system. Assisted driving is performed based in part on the output of one or more sensors typically positioned on, under, or within the vehicle. While an autonomous vehicle is an example of a system that performs assisted driving, not every assisted-driving system is designed to provide a fully autonomous vehicle. Several levels of driving automation have been defined by SAE International, usually referred to as Levels 0, 1, 2, 3, 4, and 5, respectively. For example, a Level 0 system or driving mode may involve no sustained vehicle control by the system. For example, a Level 1 system or driving mode may include adaptive cruise control, emergency brake assist, automatic emergency brake assist, lane-keeping, and/or lane centering. For example, a Level 2 system or driving mode may include highway assist, autonomous obstacle avoidance, and/or autonomous parking. For example, a Level 3 or 4 system or driving mode may include progressively increased control of the vehicle by the assisted-driving system. For example, a Level 5 system or driving mode may require no human intervention of the assisted-driving system.

Examples herein refer to a sensor. A sensor is configured to detect an event and/or a change in one or more aspects of its environment and output signal(s) reflecting the detection. As illustrative examples only, a sensor can indicate one or more of a distance between the vehicle and an object, a speed of the vehicle, a trajectory of the vehicle, or an acceleration of the vehicle. Examples of sensors that can be used with one or more embodiments include, but are not limited to: a light sensor (e.g., a camera); a scanning system (e.g., lidar); a radio-based sensor (e.g., radar); an acoustic sensor (e.g., an ultrasonic device and/or a microphone); an inertial measurement unit (e.g., a gyroscope and/or accelerometer); a speed sensor (e.g., for the vehicle or a component thereof); a location sensor (e.g., for the vehicle or a component thereof); an orientation sensor (e.g., for the vehicle or a component thereof); a torque sensor; a temperature sensor (e.g., a primary or secondary thermometer); a pressure sensor (e.g., for ambient air or a component of the vehicle); a humidity sensor (e.g., a rain detector); or a seat occupancy sensor.

Figure 1B:
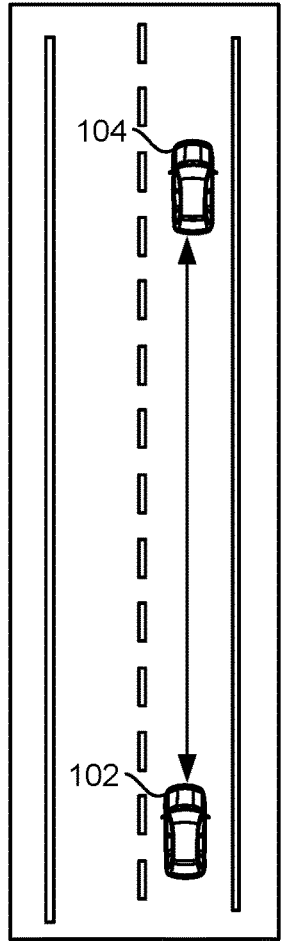
Figure 1C:
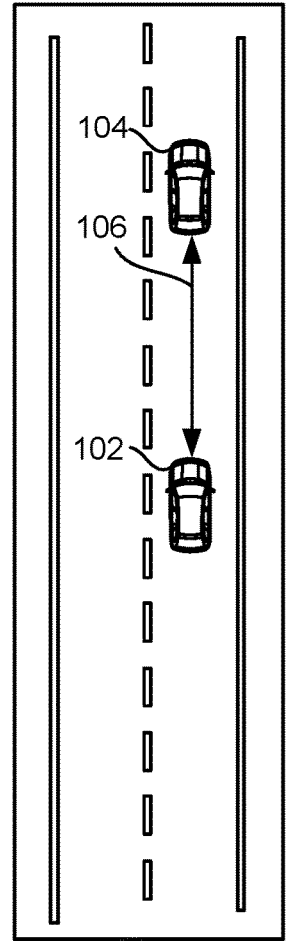

FIGS. 1A-1C show examples relating to confirming that an assisted-driving system will handle a detected traffic event relating to a vehicle ahead of an ego vehicle. The examples described with reference to FIGS. 1A-1C can be combined with one or more other examples described elsewhere herein.

These examples are described with reference to traffic on a roadway 100. A vehicle 102 is currently located in a rightmost lane on the roadway 100. For example, the roadway 100 has two-way traffic or one-way traffic. The vehicle 102 can be considered the ego vehicle. The vehicle 102 is currently traveling along the roadway 100 in a direction that is toward the top of the illustration. Particularly, an assisted-driving system is currently controlling motion of the vehicle 102. For example, a lane-keeping function and/or adaptive cruise control may currently be active in the vehicle 102. In FIG. 1A, there is currently no obstacle present ahead of the vehicle 102 on the roadway 100.

FIG. 1B shows that the vehicle 102 is approaching a vehicle 104 that is present in the same lane of the roadway 100 as the vehicle 102. The vehicle 104 may be stationary, or may be traveling slower than the vehicle 102, to name just two examples. The assisted-driving system of the vehicle 102 detects the vehicle 104 using one or more sensors. For example, the assisted-driving system of the vehicle 102 can have a headway control function (or adaptive cruise control) that allows the vehicle 102 to automatically follow behind a preceding vehicle, but the vehicle 104 may not be close enough to the vehicle 102 for such function to be applied.

The presence of the vehicle 104 in the illustration here also signifies that a passenger in the vehicle 102 can see the vehicle 104 and could perceive the vehicle 104 as an obstacle to the vehicle 102. The word obstacle here is used in a general sense to describe any physical object that can physically interact with the vehicle 102. Obstacles may be stationary (e.g., static) or moving (e.g., dynamic). Examples of obstacles include, but are not limited to, other traffic agents (such as vehicles and pedestrians), potholes, road debris, Jersey barriers, and light poles. As another example, an object can include anything positioned in the path of the ego vehicle, or another vehicle entering the path of the ego vehicle. As such, the passenger in the vehicle 102 can benefit from a confirmation that the assisted-driving system is handling the current traffic situation, namely that the vehicle 102 is approaching the vehicle 104.

The assisted-driving system of the vehicle 102 can therefore provide at least one confirmation to the passenger in response to detecting the vehicle 104. For example, this can be done before the vehicle 104 comes within the maximum distance where the vehicle 102 applies headway control to automatically follow behind the vehicle 104. The confirmation indicates to the passenger that the assisted-driving system of the vehicle 102 is handling the detected traffic event. In some implementations, the confirmation can include one or more types of physical feedback to the passenger. For example, the assisted-driving system of the vehicle 102 can gently tap the brakes of the vehicle 102 and thereby signal to the passenger that the assisted-driving system has detected the vehicle 104, without significantly altering the currently controlled motion of the vehicle 102.

FIG. 1C shows that a distance 106 between the vehicles 102 and 104 is currently about equal to a maximum distance at which the assisted-driving system of the vehicle 102 begins applying headway control so as to automatically follow behind the vehicle 104. For example, the headway control can involve maintaining a minimum separation between the vehicles 102 and 104, up to a predefined maximum speed. Applying the headway control (or, as another example, adaptive cruise control) illustrates that the assisted-driving system of the vehicle 102 that detected the vehicle 104 may have planned to take a subsequent action at some (perhaps yet undefined) time after the time of detection. However, by generating the confirmation by physical feedback to the passenger, the assisted-driving system of the vehicle 102 can provide a more comfortable riding experience where the passenger can be certain, also before definitive action is taken, that the assisted-driving system has detected the traffic event and is handling it.

Figure 2:
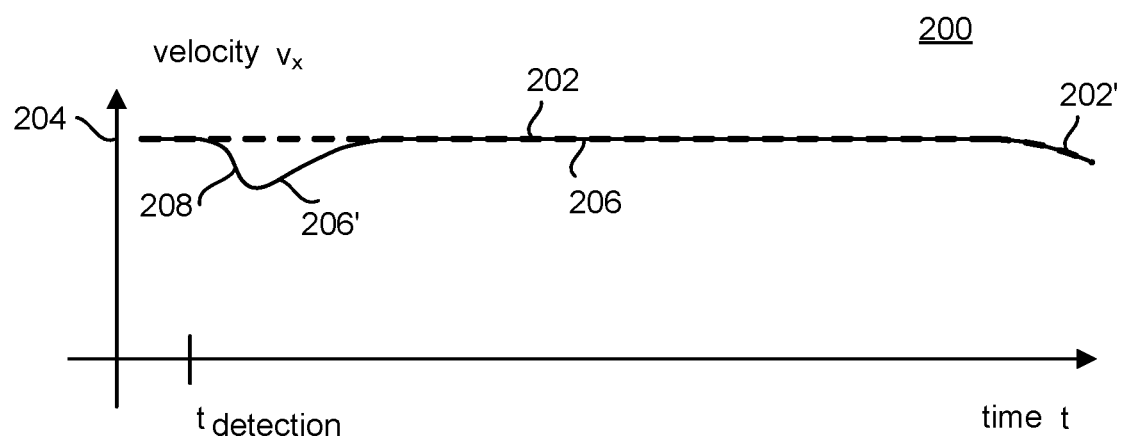
FIG. 2 shows a diagram with an example of velocities relating to the example in FIGS. 1A-1C.

FIG. 2 shows a diagram 200 with an example of velocities relating to the example in FIGS. 1A-1C. The diagram 200 can be used with one or more other examples described elsewhere herein. The diagram 200 indicates velocity (e.g., $v_x$) on a vertical axis as a function of time (e.g., t) on a horizontal axis. On the time axis, a time of detection ($t_{detection}$) indicates when the assisted-driving system detects the traffic event. For example, with reference also to FIGS. 1A-1C, the time of detection corresponds to when the assisted-driving system of the vehicle 102 detects the vehicle 104 being up ahead.

In response to detection of a traffic event, the assisted-driving system may plan one or more future actions to be performed, or may not plan any specific future action, depending on the nature of the traffic event and/or other circumstances. Actions that are planned and/or actually performed by the assisted-driving system can be indicated in the diagram 200. Here, the diagram 200 includes a graph 202 that is shown using a dashed line. The graph 202 corresponds to the vehicle's motion (that is, as controlled by the assisted-driving system) without the provision of a confirmation as described in the present disclosure. The graph 202 indicates that the vehicle has a velocity 204 at the time of detection, and that it maintains the velocity 204 over some period of time until a velocity reduction 202' that happens subsequent to the time of detection. For example, with reference also to FIGS. 1A-1C, the velocity reduction 202' can be the planned action to be performed by the assisted-driving system as the vehicle 102 approaches the vehicle 104.

Here, the diagram 200 includes a graph 206 that is shown using a solid line. The graph 206 corresponds to the vehicle's motion (that is, as controlled by the assisted-driving system) with the provision of a confirmation as described in the present disclosure. The graph 206 indicates that the vehicle has the velocity 204 at the time of detection, that the vehicle undergoes a velocity reduction 206' by a braking action (e.g., by applying brakes and/or reducing powertrain torque) immediately after the time of detection, and that it thereafter returns to the velocity 204 and maintains the velocity 204 until the velocity reduction 202'. That is, the vehicle velocity subject to the velocity reduction 206' may eventually equal the vehicle velocity subject to the velocity reduction 202'.

The velocity reduction 206' can include an initial braking 208, intended to get the passenger's attention, after which the vehicle returns to the velocity 204 at a less steep pace. For example, the slope of the velocity reduction 206' at the initial braking 208 (the amount of braking) can be greater than at any point during the velocity reduction 202'.

While the velocity reduction 206' precedes, and may at least in part have a steeper slope than, the velocity reduction 202', the velocity reduction 206' may nevertheless be designed and proportioned so as to not make a significant change in the motion of the vehicle. In some implementations, the velocity reduction 202' is defined for the assisted-driving system to handle the traffic event also without the velocity reduction 206' being performed. For example, while the velocity reduction 206' may at least momentarily be stronger than the velocity reduction 202', the velocity reduction 202' may in itself be an appropriate response to the detected traffic event.

Figure 3A:
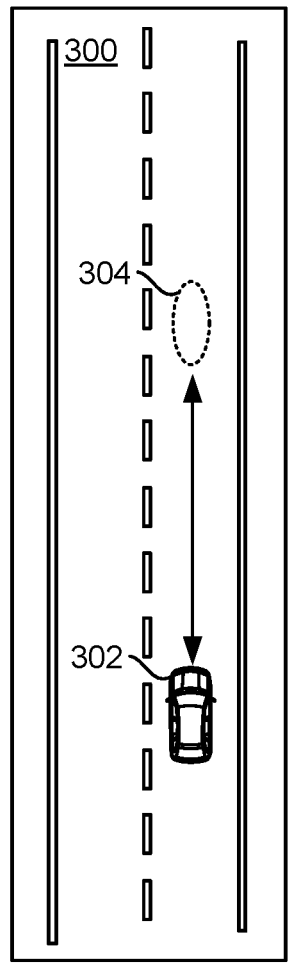
FIGS. 3A-3B show examples relating to confirming that an assisted-driving system will handle a detected traffic event relating to an object ahead of an ego vehicle.
Figure 3B:
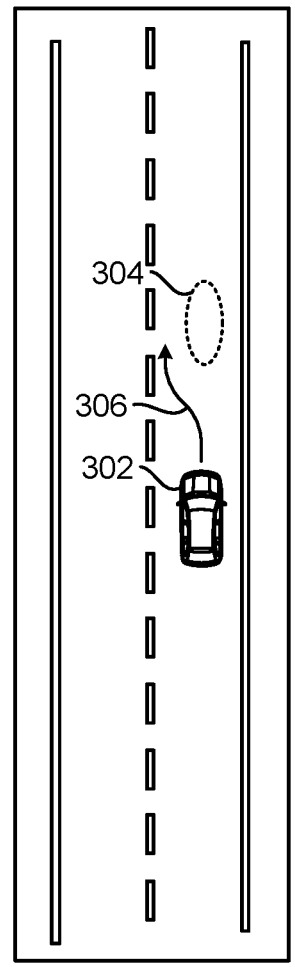

FIGS. 3A-3B show examples relating to confirming that an assisted-driving system will handle a detected traffic event relating to an object ahead of an ego vehicle. The examples described with reference to FIGS. 3A-3B can be combined with one or more other examples described elsewhere herein.

These examples are described with reference to traffic on a roadway 300. A vehicle 302 is currently located in a rightmost lane on the roadway 300. For example, the roadway 300 has two-way traffic or one-way traffic. The vehicle 302 can be considered the ego vehicle. The vehicle 302 is currently traveling along the roadway 300 in a direction that is toward the top of the illustration. Particularly, an assisted-driving system is currently controlling motion of the vehicle 302. For example, a lane-keeping function and/or adaptive cruise control may currently be active in the vehicle 302.

Currently, an obstacle 304 is present ahead of the vehicle 302 on the roadway 300. The obstacle 304 can be any type of static or dynamic hindrance in relation to the vehicle 302, including, but not limited to, a pothole in the roadway 300 or a bicyclist traveling slower than the vehicle 302. The assisted-driving system of the vehicle 302 detects the obstacle 304.

The assisted-driving system of the vehicle 302 can provide at least one confirmation to a passenger in response to detecting the obstacle 304. For example, this can be done before the vehicle 302 comes within the distance of the obstacle 304 where the assisted-driving system may perform one or more actions to handle the detection of the obstacle 304. The confirmation indicates to the passenger that the assisted-driving system of the vehicle 302 is handling the detected traffic event. In some implementations, the confirmation can include one or more types of physical feedback to the passenger. For example, the assisted-driving system of the vehicle 302 can gently adjust the steering angle (e.g., jiggle the steering wheel) of the vehicle 302 and thereby signal to the passenger that the assisted-driving system has detected the obstacle 304, without significantly altering the currently controlled motion of the vehicle 302.

FIG. 3B shows that the assisted-driving system of the vehicle 302 makes a steering-angle change 306 (e.g., an evasive maneuver) when the vehicle 302 is relatively close to the obstacle 304. For example, the steering-angle change 306 can be designed so that the vehicle 302 does not enter, or spends only a minimal time entering, the other lane of the roadway 300 in order to pass by the obstacle 304. The assisted-driving system of the vehicle 302 that detected the obstacle 304 may have planned to make the steering-angle change 306 at some (perhaps yet undefined) time after the time of detection. However, by generating the confirmation by physical feedback to the passenger, the assisted-driving system of the vehicle 302 can provide a more comfortable riding experience where the passenger can be certain, also before definitive action is taken, that the assisted-driving system has detected the traffic event and is handling it.

Figure 4:
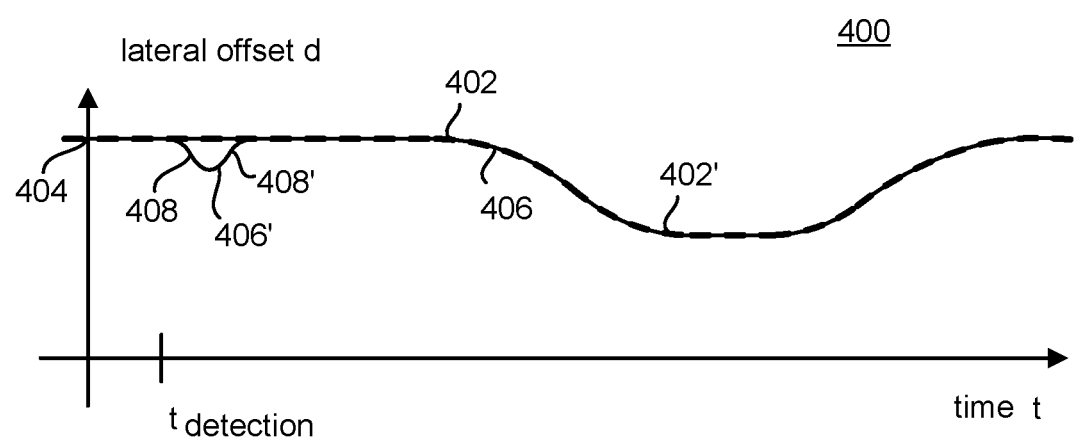
FIG. 4 shows a diagram with an example of lateral offsets relating to the example in FIGS. 3A-3B.

FIG. 4 shows a diagram 400 with an example of lateral offsets relating to the example in FIGS. 3A-3B. The diagram 400 can be used with one or more other examples described elsewhere herein. The diagram 400 indicates lateral offset (e.g., d) on a vertical axis as a function of time (e.g., t) on a horizontal axis. On the time axis, a time of detection ($t_{detection}$) indicates when the assisted-driving system detects the traffic event. For example, with reference also to FIGS. 3A-3B, the time of detection corresponds to when the assisted-driving system of the vehicle 302 detects the obstacle 304 being up ahead.

In response to detection of a traffic event, the assisted-driving system may plan one or more future actions to be performed, or may not plan any specific future action, depending on the nature of the traffic event and/or other circumstances. Actions that are planned and/or actually performed by the assisted-driving system can be indicated in the diagram 400. Here, the diagram 400 includes a graph 402 that is shown using a dashed line. The graph 402 corresponds to the vehicle's motion (that is, as controlled by the assisted-driving system) without the provision of a confirmation as described in the present disclosure. The graph 402 indicates that at the time of detection the vehicle has a lateral offset 404 (e.g., a nominally zero offset) from an arbitrary reference, and that the vehicle maintains the lateral offset 404 over some period of time until a lateral offset change 402' that happens subsequent to the time of detection. For example, with reference also to FIGS. 3A-3B, the lateral offset change 402' can be the planned action to be performed by the assisted-driving system as the vehicle 302 approaches the obstacle 304.

Here, the diagram 400 includes a graph 406 that is shown using a solid line. The graph 406 corresponds to the vehicle's motion (that is, as controlled by the assisted-driving system) with the provision of a confirmation as described in the present disclosure. The graph 406 indicates that the vehicle has the lateral offset 404 at the time of detection, that the vehicle undergoes a lateral offset change 406' by a change in steering angle (e.g., by the assisted-driving system turning the steering wheel or otherwise altering the vehicle trajectory) immediately after the time of detection, and that it thereafter returns to the lateral offset 404 and maintains the lateral offset 404 until the lateral offset change 402'. That is, the vehicle lateral offset subject to the lateral offset change 406' may eventually equal the lateral offset change subject to the lateral offset change 402'.

The lateral offset change 406' can include an initial steering 408, intended to get the passenger's attention, after which the vehicle returns to the lateral offset 404 at a less steep pace. For example, the slope of the lateral offset change 406' at the initial steering 408 (the amount of change in the steering angle) can be greater than at any point during the lateral offset change 402'. The lateral offset change 406' can include subsequent steering 408' performed immediately after the initial steering 408. For example, the subsequent steering 408' can be substantially opposite to the initial steering 408.

While the lateral offset change 406' precedes, and may at least in part have a steeper slope than, the lateral offset change 402', the lateral offset change 406' may nevertheless be designed and proportioned so as to not make a significant change in the motion of the vehicle. In some implementations, the lateral offset change 402' is defined for the assisted-driving system to handle the traffic event also without the lateral offset change 406' being performed. For example, while the lateral offset change 406' may at least momentarily be stronger than the lateral offset change 402', the lateral offset change 402' may in itself be an appropriate response to the detected traffic event. The lateral offset according to the graph 406 can eventually equal the lateral offset according to the graph 402. For example, the lateral offset of the graph 406 is equal to the lateral offset of the graph 402 during the lateral offset change 402'.

Figure 5A:
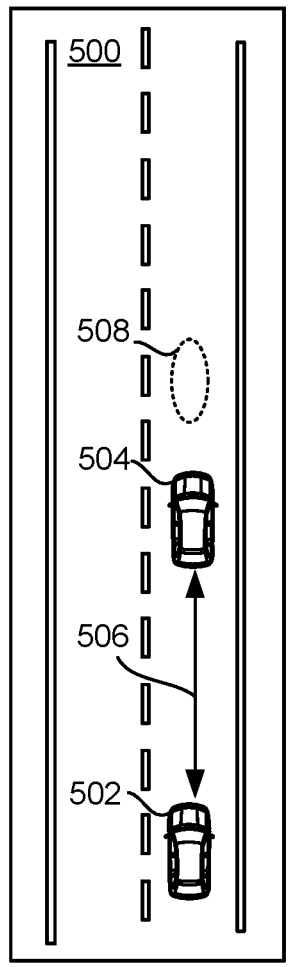
FIGS. 5A-5B show examples relating to confirming that an assisted-driving system will handle a detected traffic event relating to an object ahead of an ego vehicle when the ego vehicle is automatically following a target vehicle.
Figure 5B:
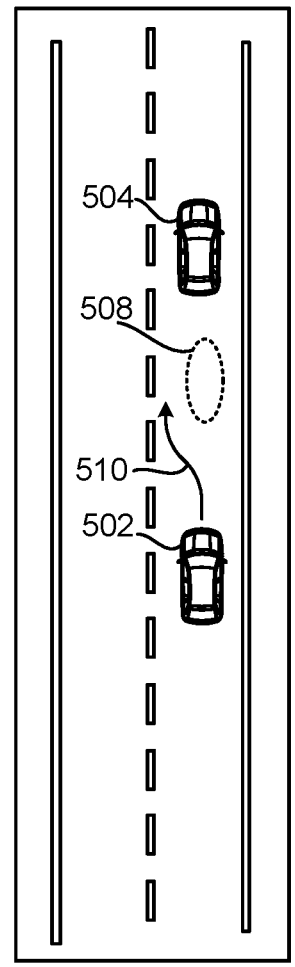

FIGS. 5A-5B show examples relating to confirming that an assisted-driving system will handle a detected traffic event relating to an object ahead of an ego vehicle when the ego vehicle is automatically following a target vehicle. The examples described with reference to FIGS. 5A-5B can be combined with one or more other examples described elsewhere herein.

In short, on a roadway 500, a vehicle 502 equipped with an ADAS/AD system is automatically following a vehicle 504 (e.g., using headway control or adaptive cruise control), and with automatic lane centering enabled. For example, the passenger of the vehicle 502 has their hands off the wheel. The automatic following is here schematically indicated by an arrow 506. An obstacle 508 is present on the roadway 500. The condition of the road ahead of the vehicle 502 is largely obscured by the vehicle 504. Suddenly, the obstacle 508 (e.g., a pothole) becomes visible to the passenger of the vehicle 502 right after the vehicle 504 has driven over it. The pothole may be in a position such that one or more wheels of vehicle 502 will run into the pothole unless some form of steering maneuver adjusts the path of the vehicle 502 (e.g., by way of lateral displacement). For example, such maneuvers are known by terms like "swerving" and "temporary lateral lane biasing". With the advances in modern perception systems, the ADAS/AD system can adjust the trajectory of the vehicle 502 and follow a pothole-free trajectory (as schematically indicated by an arrow 510). For example, the vehicle 502 can swerve just enough to prevent any of the wheels coming in contact with the obstacle 508.

Humans inside vehicles are generally less adept at perceiving whether a wheel will avoid a pothole, and will not necessarily feel confident the ADAS/AD system is executing a maneuver that will avoid the pothole, in particular if that maneuver (here indicated by the arrow 510) is designed for minimal lateral displacement. An audio- or visual-based notification that indicates the system will avoid the pothole may be ambiguous and not increase the confidence of the driver of the vehicle 502. In addition to minimizing lateral displacement, a typical maneuver-design procedure can take quantities like lateral acceleration and jerk into account. The present subject matter can be used to design an alternative pothole-avoidance maneuver that makes it clearer to the user that vehicle 502 will, in fact, avoid the pothole. This can be achieved by an initial rapid but safe adjustment of the steering angle, producing a lateral nudge that clearly communicates the system's intention to avoid the pothole.

In more detail now, the present examples are described with reference to traffic on the roadway 500. The vehicle 502 is currently located in a rightmost lane on the roadway 500. For example, the roadway 500 has two-way traffic or one-way traffic. The vehicle 502 can be considered the ego vehicle. The vehicle 502 is currently traveling along the roadway 500 in a direction that is toward the top of the illustration. Particularly, an assisted-driving system is currently controlling motion of the vehicle 502 to automatically follow behind the vehicle 504. For example, a lane-keeping function may currently be active in the vehicle 502.

Currently, the obstacle 508 is present ahead of the vehicle 504 on the roadway 500. The obstacle 508 can be any type of static or dynamic hindrance in relation to the vehicle 502, including, but not limited to, a pothole in the roadway 500 or a bicyclist traveling slower than the vehicle 502. The assisted-driving system of the vehicle 502 detects the obstacle 508.

The assisted-driving system of the vehicle 502 can provide at least one confirmation to a passenger in response to detecting the obstacle 508. For example, this can be done before the vehicle 502 comes within the distance of the obstacle 508 where the assisted-driving system may perform one or more actions to handle the detection of the obstacle 508. The confirmation indicates to the passenger that the assisted-driving system of the vehicle 502 is handling the detected traffic event. In some implementations, the confirmation can include one or more types of physical feedback to the passenger. For example, the assisted-driving system of the vehicle 502 can gently adjust the steering angle (e.g., jiggle the steering wheel) of the vehicle 502 and thereby signal to the passenger that the assisted-driving system has detected the obstacle 508, without significantly altering the currently controlled motion of the vehicle 502.

FIG. 5B shows that the assisted-driving system of the vehicle 502 makes a steering-angle change (e.g., an evasive maneuver), schematically illustrated by the arrow 510, when the vehicle 502 is relatively close to the obstacle 508. For example, the steering-angle change can be designed so that the vehicle 502 does not enter, or spends only a minimal time entering, the other lane of the roadway 500 in order to pass by the obstacle 508. The assisted-driving system of the vehicle 502 that detected the obstacle 508 may have planned to make the steering-angle change at some (perhaps yet undefined) time after the time of detection. However, by generating the confirmation by physical feedback to the passenger, the assisted-driving system of the vehicle 502 can provide a more comfortable riding experience where the passenger can be certain, also before definitive action is taken, that the assisted-driving system has detected the traffic event and is handling it.

Figure 6:
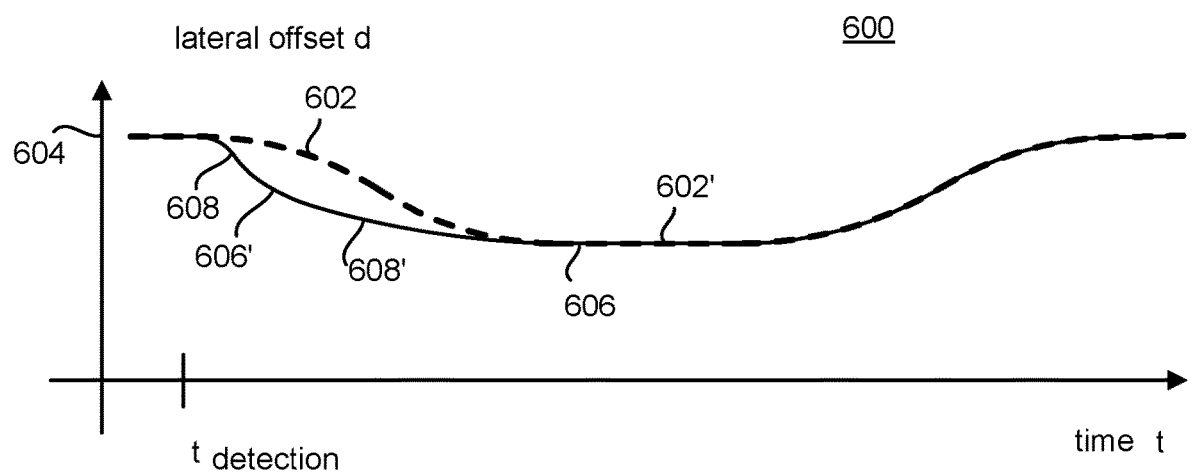
FIG. 6 shows a diagram with an example of lateral offsets relating to the example in FIGS. 5A-5B.

FIG. 6 shows a diagram 600 with an example of lateral offsets relating to the example in FIGS. 5A-5B. The diagram 600 can be used with one or more other examples described elsewhere herein. The diagram 600 indicates lateral offset (e.g., d) on a vertical axis as a function of time (e.g., t) on a horizontal axis. On the time axis, a time of detection ($t_{detection}$) indicates when the assisted-driving system detects the traffic event. For example, with reference also to FIGS. 5A-5B, the time of detection corresponds to when the assisted-driving system of the vehicle 502 detects the obstacle 508 being up ahead.

In response to detection of a traffic event, the assisted-driving system may plan one or more future actions to be performed, or may not plan any specific future action, depending on the nature of the traffic event and/or other circumstances. Actions that are planned and/or actually performed by the assisted-driving system can be indicated in the diagram 600. Here, the diagram 600 includes a graph 602 that is shown using a dashed line. The graph 602 corresponds to the vehicle's motion (that is, as controlled by the assisted-driving system) without the provision of a confirmation as described in the present disclosure. The graph 602 indicates that at the time of detection the vehicle has a lateral offset 604 (e.g., a nominally zero offset) from an arbitrary reference, and that the vehicle maintains the lateral offset 604 over some period of time until a lateral offset change 602' that happens subsequent to the time of detection. For example, with reference also to FIGS. 5A-5B, the lateral offset change 602' can be the planned action to be performed by the assisted-driving system as the vehicle 502 approaches the obstacle 508.

Here, the diagram 600 includes a graph 606 that is shown using a solid line. The graph 606 corresponds to the vehicle's motion (that is, as controlled by the assisted-driving system) with the provision of a confirmation as described in the present disclosure. The graph 606 indicates that the vehicle has the lateral offset 604 at the time of detection, that the vehicle undergoes a lateral offset change 606' by a change in steering angle (e.g., by the assisted-driving system turning the steering wheel or otherwise altering the vehicle trajectory) immediately after the time of detection, and that it subsequently meets the lateral offset change 602'. That is, the vehicle lateral offset subject to the lateral offset change 606' may eventually equal the lateral offset change subject to the lateral offset change 602'.

The lateral offset change 606' can include an initial steering 608, intended to get the passenger's attention, after which the vehicle returns to the lateral offset 604 at a less steep pace. For example, the slope of the lateral offset change 606' at the initial steering 608 (the amount of change in the steering angle) can be greater than at any point during the lateral offset change 602'. The lateral offset change 606' can include subsequent steering 608' performed immediately after the initial steering 608. For example, the subsequent steering 608' can be different from the initial steering 608.

While the lateral offset change 606' precedes, and may at least in part have a steeper slope than, the lateral offset change 602', the lateral offset change 606' may nevertheless be designed and proportioned so as to not make a significant change in the motion of the vehicle. In some implementations, the lateral offset change 602' is defined for the assisted-driving system to handle the traffic event also without the lateral offset change 606' being performed. For example, while the lateral offset change 606' may at least momentarily be stronger than the lateral offset change 602', the lateral offset change 602' may in itself be an appropriate response to the detected traffic event. The lateral offset according to the graph 606 can eventually equal the lateral offset according to the graph 602. For example, the lateral offset of the graph 606 is equal to the lateral offset of the graph 602 during a later part of the lateral offset change 602'.

Figure 7A:
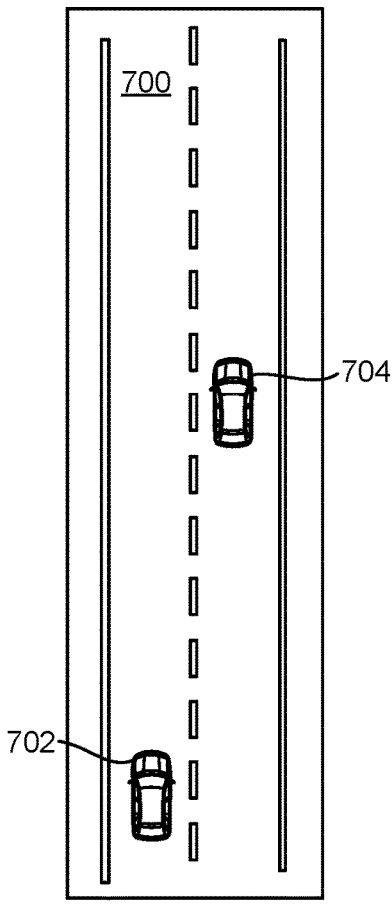
FIGS. 7A-7C show examples relating to confirming that an assisted-driving system will handle a detected traffic event relating to a vehicle merging into a lane of an ego vehicle.
Figure 7B:
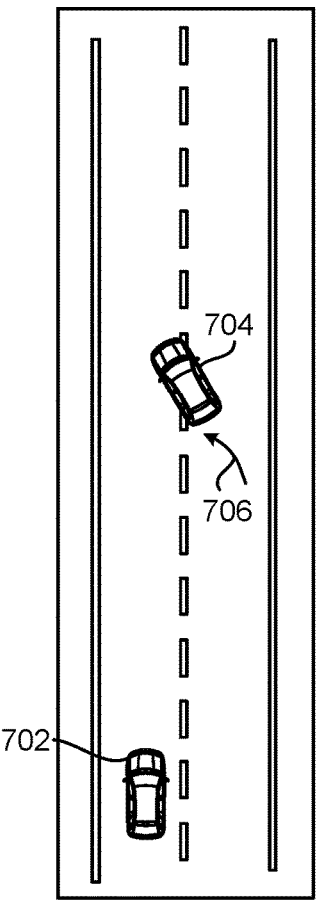
Figure 7C:
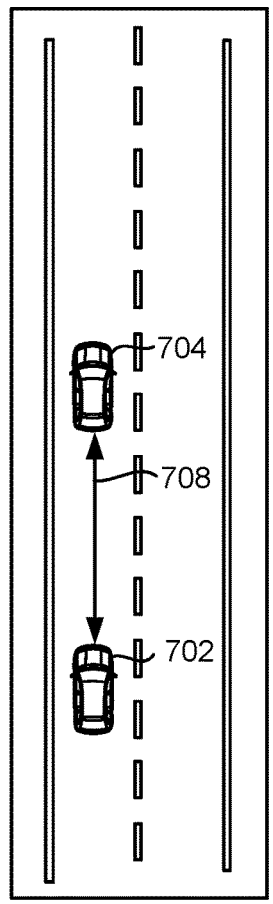

FIGS. 7A-7C show examples relating to confirming that an assisted-driving system will handle a detected traffic event relating to a vehicle merging into a lane of an ego vehicle. The examples described with reference to FIGS. 7A-7C can be combined with one or more other examples described elsewhere herein.

These examples are described with reference to traffic on a roadway 700. A vehicle 702 is currently located in a left lane on the roadway 700. For example, the roadway 700 has one-way traffic proceeding in either of two lanes. The vehicle 702 can be considered the ego vehicle. The vehicle 702 is currently traveling along the roadway 700 in a direction that is toward the top of the illustration. Particularly, an assisted-driving system is currently controlling motion of the vehicle 702. For example, a lane-keeping function and/or adaptive cruise control may currently be active in the vehicle 702. Currently, a vehicle 704 is present in the right lane of the roadway 700 and somewhat ahead of the vehicle 702.

FIG. 7B illustrates that the vehicle 704 begins to move from the right lane to the left lane ahead of the vehicle 702, as schematically indicated by an arrow 706. The assisted-driving system of the vehicle 702 detects this traffic event. For example, the assisted-driving system of the vehicle 702 may plan one or more actions to handle the traffic event, or may not plan a specific future action, depending on the nature of the traffic event and/or other circumstances.

The assisted-driving system of the vehicle 702 can provide at least one confirmation to a passenger in response to detecting the motion of the vehicle 704. For example, this can be done before the vehicle 704 fully enters the lane of the vehicle 702 where the assisted-driving system may perform one or more actions to handle the detection of the vehicle 704. The confirmation indicates to the passenger that the assisted-driving system of the vehicle 702 is handling the detected traffic event. In some implementations, the confirmation can include one or more types of physical feedback to the passenger. For example, the assisted-driving system of the vehicle 702 can gently tap the brakes of the vehicle 702 and thereby signal to the passenger that the assisted-driving system has detected the vehicle 704, without significantly altering the currently controlled motion of the vehicle 702.

FIG. 7C shows that a distance 708 between the vehicles 702 and 704 is currently about equal to a maximum distance at which the assisted-driving system of the vehicle 702 begins applying headway control so as to automatically follow behind the vehicle 704. For example, the headway control can involve maintaining a minimum separation between the vehicles 702 and 704, up to a predefined maximum speed. Applying the headway control (or, as another example, adaptive cruise control) illustrates that the assisted-driving system of the vehicle 702 that detected the vehicle 704 may have planned to take a subsequent action at some (perhaps yet undefined) time after the time of detection. However, by generating the confirmation by physical feedback to the passenger, the assisted-driving system of the vehicle 702 can provide a more comfortable riding experience where the passenger can be certain, also before definitive action is taken, that the assisted-driving system has detected the traffic event and is handling it.

Figure 8:
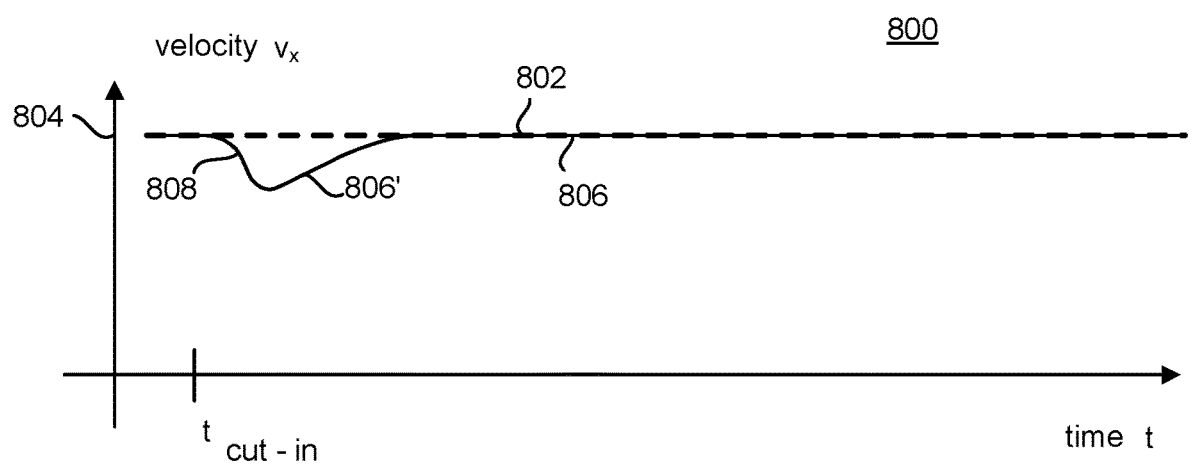
FIG. 8 shows a diagram with an example of velocities relating to the example in FIGS. 7A-7C.

FIG. 8 shows a diagram 800 with an example of velocities relating to the example in FIGS. 7A-7C. The diagram 800 can be used with one or more other examples described elsewhere herein. The diagram 800 indicates velocity (e.g., $v_x$) on a vertical axis as a function of time (e.g., t) on a horizontal axis. On the time axis, a time of detection ($t_{cut-in}$) indicates when the assisted-driving system detects the traffic event. For example, with reference also to FIGS. 7A-7C, the time of detection corresponds to when the assisted-driving system of the vehicle 702 detects the vehicle 704 entering its lane.

In response to detection of a traffic event, the assisted-driving system may plan one or more future actions to be performed, or may not plan any specific future action, depending on the nature of the traffic event and/or other circumstances. Here, the diagram 800 includes a graph 802 that is shown using a dashed line. The graph 802 corresponds to the vehicle's motion (that is, as controlled by the assisted-driving system) without the provision of a confirmation as described in the present disclosure. The graph 802 indicates that the vehicle has a velocity 804 at the time of detection, and that it maintains the velocity 804 over some period of time.

Here, the diagram 800 includes a graph 806 that is shown using a solid line. The graph 806 corresponds to the vehicle's motion (that is, as controlled by the assisted-driving system) with the provision of a confirmation as described in the present disclosure. The graph 806 indicates that the vehicle has the velocity 804 at the time of detection, that the vehicle undergoes a velocity reduction 806' by a braking action (e.g., by applying brakes and/or reducing powertrain torque) immediately after the time of detection, and that it thereafter returns to the velocity 804 and maintains the velocity 804. That is, the vehicle velocity subject to the velocity reduction 806' may eventually equal the vehicle velocity according to the graph 802. The velocity reduction 806' can include an initial braking 808, intended to get the passenger's attention, after which the vehicle returns to the velocity 804 at a less steep pace.

In the current example, the assisted-driving system may not have planned to perform any specific action in response to the detection of the vehicle 704. However, the confirmation indicates to the passenger that the assisted-driving system has detected the traffic event and is handling it.

Figure 9A:
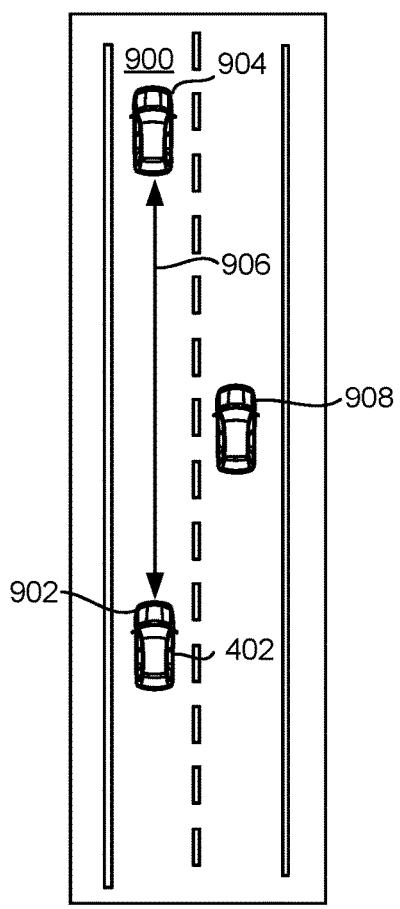
FIGS. 9A-9C show examples relating to confirming that an assisted-driving system will handle a detected traffic event relating to a vehicle merging into a lane of an ego vehicle when the ego vehicle is automatically following a target vehicle.
Figure 9B:
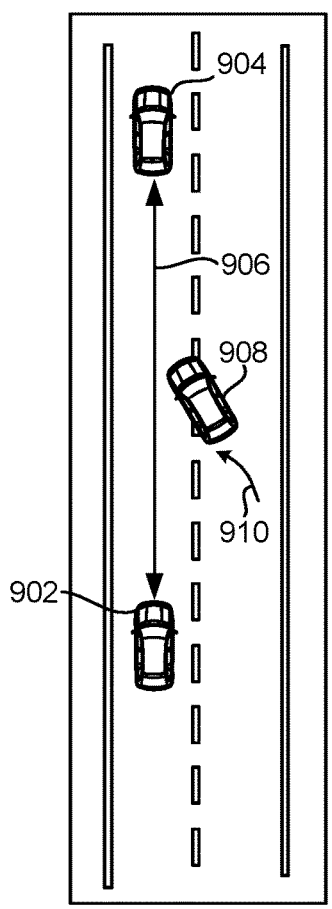
Figure 9C:
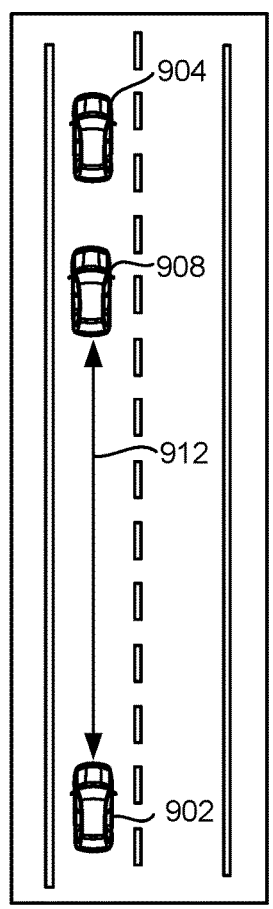

FIGS. 9A-9C show examples relating to confirming that an assisted-driving system will handle a detected traffic event relating to a vehicle merging into a lane of an ego vehicle when the ego vehicle is automatically following a target vehicle. The examples described with reference to FIGS. 9A-9C can be combined with one or more other examples described elsewhere herein.

In short, on a roadway 900, a vehicle 902 equipped with an ADAS/AD system is following a vehicle 904 with a safe time gap, and with automatic lane centering enabled, as schematically indicated by an arrow 906. For example, the driver of the vehicle 902 may have their hands off the wheel. A vehicle 908 overtakes the vehicle 902 and cuts in right in front of the vehicle 902, as schematically indicated by an arrow 910. The vehicle 908 does this at what the passenger of the vehicle 902 may perceive as a potentially risky proximity (a time-gap of less than 1 second, say). If the passenger of the vehicle 902 were driving manually, they may immediately have moved their foot to the brake pedal and pressed on it (e.g., relatively hard) to increase the distance to the vehicle 908. This would produce a quick reduction of the velocity of the vehicle 902, or more precisely a large-magnitude spike in longitudinal jerk. Since the vehicle 902 is operating with assisted driving (e.g., autonomously), the ADAS/AD system has perceived the situation and developed a plan to reduce speed to avoid colliding into the rear of the vehicle 908. From the perspective of the planning algorithm, this may not be a particularly challenging situation, and the ADAS/AD system can compute a planned velocity profile) that is both safe (it avoids collision) and smooth (the decrease in velocity is gradual, or not particularly sudden). While executing the profile would be safe, the smooth reduction in velocity may allow the distance to the vehicle 908 to get short enough for the passenger in the vehicle 902 to worry and feel uncomfortable (despite the potential notification through a "ding"-like sound). That is, the passenger of the vehicle 902 might prefer a jerkier (not as smooth) response by the ADAS/AD system that immediately reduces the velocity enough for the passenger of the vehicle 902 to perceive a bit of a push against the seat belt. The ADAS/AD system can design a velocity profile to satisfy this preference. Contrary to standard profile-design criteria, the profile can purposefully make the executed motion feel jerky initially. Mathematically, the design procedure for this profile does not have to involve the quantity jerk, or time derivative of acceleration. The initial jerk can serve as a clear message to any passenger in the vehicle 902 that the potential danger is accounted for and is acted on, leaving little, if any, doubt that there is virtually no risk of collision. After this initial jerk, which in addition to communicating intent to the user also increases the distance to the vehicle 908, the remainder of the velocity profile can be designed with other priorities, such as the comfort.

In more detail now, the present examples are described with reference to traffic on the roadway 900. The vehicle 902 is currently located in a left lane on the roadway 900. For example, the roadway 900 has one-way traffic proceeding in either of two lanes. The vehicle 902 can be considered the ego vehicle. The vehicle 902 is currently traveling along the roadway 900 in a direction that is toward the top of the illustration. An assisted-driving system is currently controlling motion of the vehicle 902. Particularly, the vehicle 902 is currently automatically following behind the vehicle 904. For example, a lane-keeping function and/or adaptive cruise control may currently be active in the vehicle 902. Currently, the vehicle 908 is present in the right lane of the roadway 900 and somewhat ahead of the vehicle 902.

FIG. 9B illustrates that the vehicle 908 begins to move from the right lane to the left lane ahead of the vehicle 902, as schematically indicated by the arrow 910. The assisted-driving system of the vehicle 902 detects this traffic event. For example, the assisted-driving system of the vehicle 902 may plan one or more actions to handle the traffic event, or may not plan a specific future action, depending on the nature of the traffic event and/or other circumstances.

The assisted-driving system of the vehicle 902 can provide at least one confirmation to a passenger in response to detecting the motion of the vehicle 908. For example, this can be done before the vehicle 908 fully enters the lane of the vehicle 902 where the assisted-driving system may perform one or more actions to handle the detection of the vehicle 908. The confirmation indicates to the passenger that the assisted-driving system of the vehicle 902 is handling the detected traffic event. In some implementations, the confirmation can include one or more types of physical feedback to the passenger. For example, the assisted-driving system of the vehicle 902 can gently tap the brakes of the vehicle 902 and thereby signal to the passenger that the assisted-driving system has detected the vehicle 908, without significantly altering the currently controlled motion of the vehicle 902.

FIG. 9C shows that a distance 912 between the vehicles 902 and 908 is currently such that the assisted-driving system of the vehicle 902 applies headway control so as to automatically follow behind the vehicle 908. For example, the headway control can involve maintaining a minimum separation between the vehicles 902 and 908, up to a predefined maximum speed. Applying the headway control (or, as another example, adaptive cruise control) illustrates that the assisted-driving system of the vehicle 902 that detected the vehicle 908 may have planned to take a subsequent action at some (perhaps yet undefined) time after the time of detection. However, by generating the confirmation by physical feedback to the passenger, the assisted-driving system of the vehicle 902 can provide a more comfortable riding experience where the passenger can be certain, also before definitive action is taken, that the assisted-driving system has detected the traffic event and is handling it.

Figure 10:
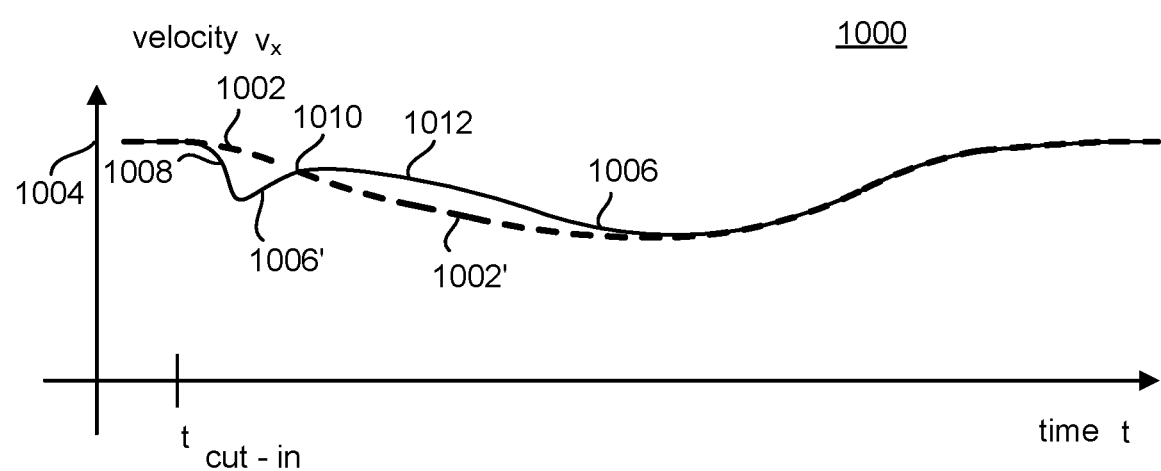
FIG. 10 shows a diagram with an example of velocities relating to the example in FIGS. 9A-9C.

FIG. 10 shows a diagram 1000 with an example of velocities relating to the example in FIGS. 9A-9C. The diagram 1000 can be used with one or more other examples described elsewhere herein. The diagram 1000 indicates velocity (e.g., $v_x$) on a vertical axis as a function of time (e.g., t) on a horizontal axis. On the time axis, a time of detection ($t_{cut-in}$) indicates when the assisted-driving system detects the traffic event. For example, with reference also to FIGS. 9A-9C, the time of detection corresponds to when the assisted-driving system of the vehicle 902 detects the vehicle 908 entering its lane.

In response to detection of a traffic event, the assisted-driving system may plan one or more future actions to be performed, or may not plan any specific future action, depending on the nature of the traffic event and/or other circumstances. Here, the diagram 1000 includes a graph 1002 that is shown using a dashed line. The graph 1002 corresponds to the vehicle's motion (that is, as controlled by the assisted-driving system) without the provision of a confirmation as described in the present disclosure. The graph 1002 indicates that the vehicle has a velocity 1004 at the time of detection, and that it maintains the velocity 1004 over some period of time until a velocity reduction 1002' that happens subsequent to the time of detection.

Here, the diagram 1000 includes a graph 1006 that is shown using a solid line. The graph 1006 corresponds to the vehicle's motion (that is, as controlled by the assisted-driving system) with the provision of a confirmation as described in the present disclosure. The graph 1006 indicates that the vehicle has the velocity 1004 at the time of detection, that the vehicle undergoes a velocity reduction 1006' by a braking action (e.g., by applying brakes and/or reducing powertrain torque) immediately after the time of detection, and that it eventually returns to the velocity 1004 and maintains the velocity 1004. That is, the vehicle velocity subject to the velocity reduction 1006' may eventually equal the vehicle velocity according to the graph 1002. The velocity reduction 1006' can include an initial braking 1008, intended to get the passenger's attention. After the initial braking 1008, the vehicle can regain velocity at a less steep pace.

The velocity reduction 1006' precedes the velocity reduction 1002' and is stronger than the velocity reduction 1002'. At least at an instant 1010, the velocity reduction 1006' can equal the velocity reduction 1002'. After the velocity reduction 1006' and the velocity reduction 1002' are equal at the instant 1010, at an instant 1012 a velocity of the velocity reduction 1006' can be greater than a velocity of the velocity reduction 1002'. After the instant 1012, the velocity of the velocity reduction 1006' can become equal to the velocity of the velocity reduction 1002'.

In the current example, the assisted-driving system may not have planned to perform any specific action in response to the detection of the vehicle 908. However, the confirmation indicates to the passenger that the assisted-driving system has detected the traffic event and is handling it.

Figure 11:
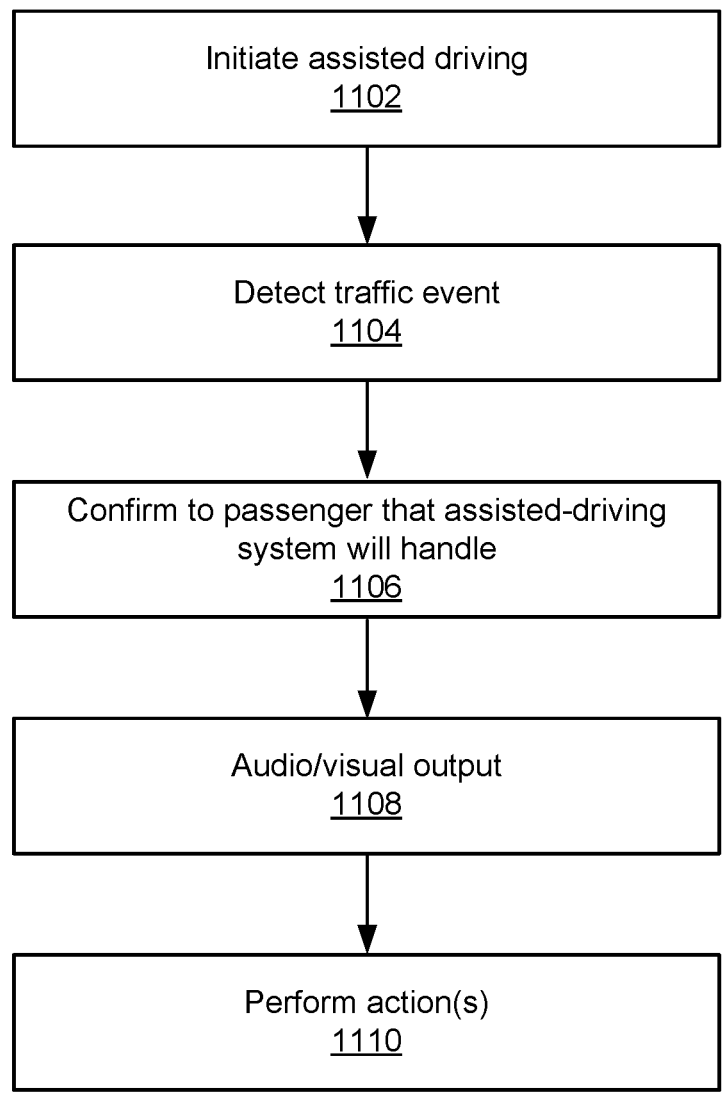
FIG. 11 shows a flowchart for an example of a process.

FIG. 11 shows a flowchart for an example of a process 1100. The process 1100 can be used together with one or more other examples described herein. More or fewer operations than shown can be performed. Two or more operations can be performed in a different order unless otherwise indicated.

At operation 1102, assisted driving can be initiated. In some implementations, an assisted-driving system can control motion of at least one of the ego vehicles described elsewhere herein. For example, roadway control, adaptive cruise control, and/or lane-keeping functionality can be applied.

At operation 1104, a traffic event can be detected. In some implementations, at least one sensor of the ego vehicle can be used for detecting a traffic event external to the ego vehicle.

At operation 1106, the assisted-driving system can provide confirmation to a passenger of the ego vehicle that the assisted-driving system is handling the traffic event. In some implementations, the confirmation includes a physical feedback perceptible to the passenger. For example, one or more of the physical feedbacks described elsewhere herein can be provided.

At operation 1108, an audio output and/or a visual output can be generated by the assisted-driving system.

At operation 1110, the assisted-driving system can perform one or more actions in response to detecting the traffic event. In some implementations, the action(s) can resemble or include a type of actuation that was used in generating the physical feedback to the passenger. For example, the type of actuation can be related to how the passenger would be expected to respond upon noticing the traffic event.

Figure 12:
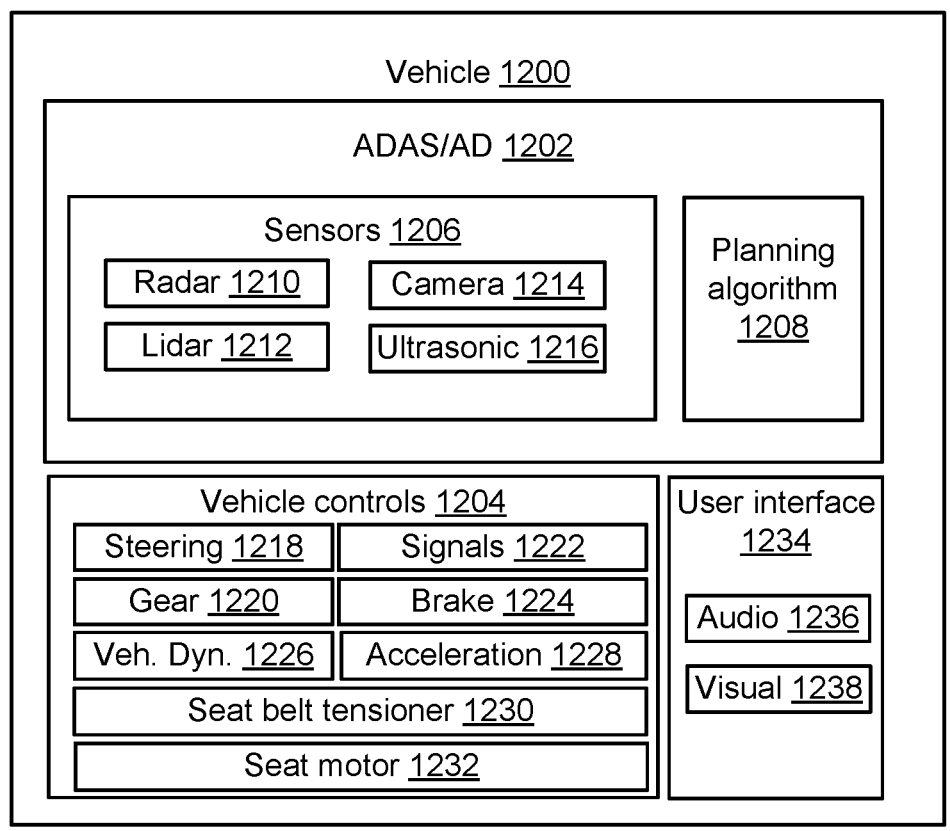
FIG. 12 shows an example of a vehicle.

FIG. 12 shows an example of a vehicle 1200. The vehicle 1200 can be used with one or more other examples described elsewhere herein. The vehicle 1200 includes an ADAS/AD system 1202 and vehicle controls 1204. The ADAS/AD system 1202 can be implemented using some or all components described with reference to FIG. 13 below. The ADAS/AD system 1202 includes sensors 1206 and a planning algorithm 1208. Other aspects that the vehicle 1200 may include, including, but not limited to, other components of the vehicle 1200 where the ADAS/AD system 1202 may be implemented, are omitted here for simplicity.

The sensors 1206 are here described as also including appropriate circuitry and/or executable programming for processing sensor output and performing a detection based on the processing. The sensors 1206 can include a radar 1210. In some implementations, the radar 1210 can include any object detection system that is based at least in part on radio waves. For example, the radar 1210 can be oriented in a forward direction relative to the vehicle and can be used for detecting at least a distance to one or more other objects (e.g., another vehicle). The radar 1210 can detect a traffic event by sensing the presence of an object in relation to the vehicle 1200.

The sensors 1206 can include a lidar 1212. In some implementations, the lidar 1212 can include any object detection system that is based at least in part on laser light. For example, the lidar 1212 can be oriented in any direction relative to the vehicle and can be used for detecting at least a distance to one or more other objects (e.g., another vehicle). The lidar 1212 can detect a traffic event by sensing the presence of an object in relation to the vehicle 1200.

The sensors 1206 can include a camera 1214. In some implementations, the camera 1214 can include any image sensor whose signal(s) the vehicle 1200 takes into account. For example, the camera 1214 can be oriented in any direction relative to the vehicle and can be used for detecting vehicles, lanes, lane markings, and/or road signage. The camera 1214 can detect a traffic event by visually registering a circumstance in relation to the vehicle 1200.

The sensors 1206 can include an ultrasonic sensor 1216. In some implementations, the ultrasonic sensor 1216 can include any transmitter, receiver, and/or transceiver used in detecting at least the proximity of an object based on ultrasound. For example, the ultrasonic sensor 1216 can be positioned at or near an outer surface of the vehicle. The ultrasonic sensor 1216 can detect a traffic event by sensing the presence of an object in relation to the vehicle 1200.

Any of the sensors 1206 alone, or two or more of the sensors 1206 collectively, can detect, while the ADAS/AD system 1202 is controlling motion of the vehicle 1200, a traffic event external to the vehicle 1200. In some implementations, at least one of the sensors 1206 can generate an output that is taken into account in detecting a traffic event. For example, the output of two or more sensors (e.g., the outputs of the radar 1210, the lidar 1212, and the camera 1214) can be combined to determine a distance between an ego vehicle and a target vehicle. In some implementations, one or more other types of sensors can additionally or instead be included in the sensors 1206.

The planning algorithm 1208 can plan for the ADAS/AD system 1202 to perform one or more actions, or to not perform any action, in response to a detected traffic event. The output of one or more of the sensors 1206 can be taken into account. In some implementations, the planning algorithm 1208 can define the velocity reduction 202' (FIG. 2), the lateral offset change 402' (FIG. 4), the lateral offset change 602' (FIG. 6), the automatic following of the vehicle 704 (FIG. 7C), and/or the velocity reduction 1002' (FIG. 10). The planning algorithm 1208 or another aspect of the ADAS/AD system 1202 can trigger performance of the physical feedback to the passenger in response to detection of the traffic event. For example, performance of one or more of the following can be triggered: the velocity reduction 206' (FIG. 2), the lateral offset change 406' (FIG. 4), the lateral offset change 606' (FIG. 6), the velocity reduction 806' (FIG. 8), and/or the velocity reduction 1006' (FIG. 10).

The vehicle controls 1204 can include a steering control 1218. In some implementations, the ADAS/AD system 1202 and/or another driver of the vehicle 1200 controls the trajectory of the vehicle 1200 by adjusting a steering angle of at least one wheel by way of manipulating the steering control 1218. The steering control 1218 can be configured for controlling the steering angle though a mechanical connection between the steering control 1218 and the adjustable wheel, or can be part of a steer-by-wire system.

The vehicle controls 1204 can include a gear control 1220. In some implementations, the ADAS/AD system 1202 and/or another driver of the vehicle 1200 uses the gear control 1220 to choose from among multiple operating modes of a vehicle (e.g., a Drive mode, a Neutral mode, or a Park mode). For example, the gear control 1220 can be used to control an automatic transmission in the vehicle 1200.

The vehicle controls 1204 can include signal controls 1222. In some implementations, the signal controls 1222 can control one or more signals that the vehicle 1200 can generate. For example, the signal controls 1222 can control a turn signal and/or a horn of the vehicle 1200.

The vehicle controls 1204 can include brake controls 1224. In some implementations, the brake controls 1224 can control one or more types of braking systems designed to slow down the vehicle, stop the vehicle, and/or maintain the vehicle at a standstill when stopped. For example, the brake controls 1224 can be actuated by the ADAS/AD system 1202. As another example, the brake controls 1224 can be actuated by the driver using a brake pedal.

The vehicle controls 1204 can include a vehicle dynamic system 1226. In some implementations, the vehicle dynamic system 1226 can control one or more functions of the vehicle 1200 in addition to, or in the absence of, or in lieu of, the driver's control. For example, when the vehicle comes to a stop on a hill, the vehicle dynamic system 1226 can hold the vehicle at standstill if the driver does not activate the brake control 1224 (e.g., step on the brake pedal).

The vehicle controls 1204 can include an acceleration control 1228. In some implementations, the acceleration control 1228 can control one or more types of propulsion motor of the vehicle. For example, the acceleration control 1228 can control the electric motor(s) and/or the internal-combustion motor(s) of the vehicle 1200.

The vehicle controls 1204 can include a seat belt tensioner 1230. In some implementations, the seat belt tensioner 1230 can control the tension of a seat belt (e.g., increase and/or decrease the tension) for one or more seats of the vehicle 1200. For example, the seat belt tensioner 1230 can control the tension to apply an amount of pretension to the seat belt in the event of an impact, and/or to provide a physical feedback to the passenger upon detection of a traffic event.

The vehicle controls 1204 can include a seat motor 1232. In some implementations, the seat motor 1232 can control the lateral position (e.g., move the seat in a fore-aft direction) and/or configuration (e.g., adjust a seatback inclination) of one or more seats of the vehicle 1200. For example, the seat motor 1232 can control the position/inclination according to a user input (e.g., a comfort setting), and/or to provide a physical feedback to the passenger upon detection of a traffic event.

Some or all of the vehicle controls 1204 can be configured for providing physical feedback that is perceptible to a passenger of the vehicle 1200. Such physical feedback can serve as a confirmation to the passenger that the ADAS/AD system 1202 is handling a detected traffic event.

The vehicle 1200 can include a user interface 1234. The user interface 1234 can include an audio interface 1236. In some implementations, the audio interface 1236 can include one or more speakers positioned in the passenger compartment. For example, the audio interface 1236 can at least in part operate together with an infotainment system in the vehicle.

The user interface 1234 can include a visual interface 1238. In some implementations, the visual interface 1238 can include at least one display device in the passenger compartment of the vehicle 1200. For example, the visual interface 1238 can include a touchscreen device and/or an instrument cluster display.

In some implementations, a motor of the vehicle 1200 can be actuated to generate physical feedback for the passenger. For example, the motor can be controlled to increase the speed or decrease the speed of the vehicle 1200.

In some implementations, the provision of physical feedback for a passenger can be performed in combination with presentation of one or more messages. For example, the audio interface 1236 and/or the visual interface 1238 can be actuated upon detection of a traffic event.

Figure 13:
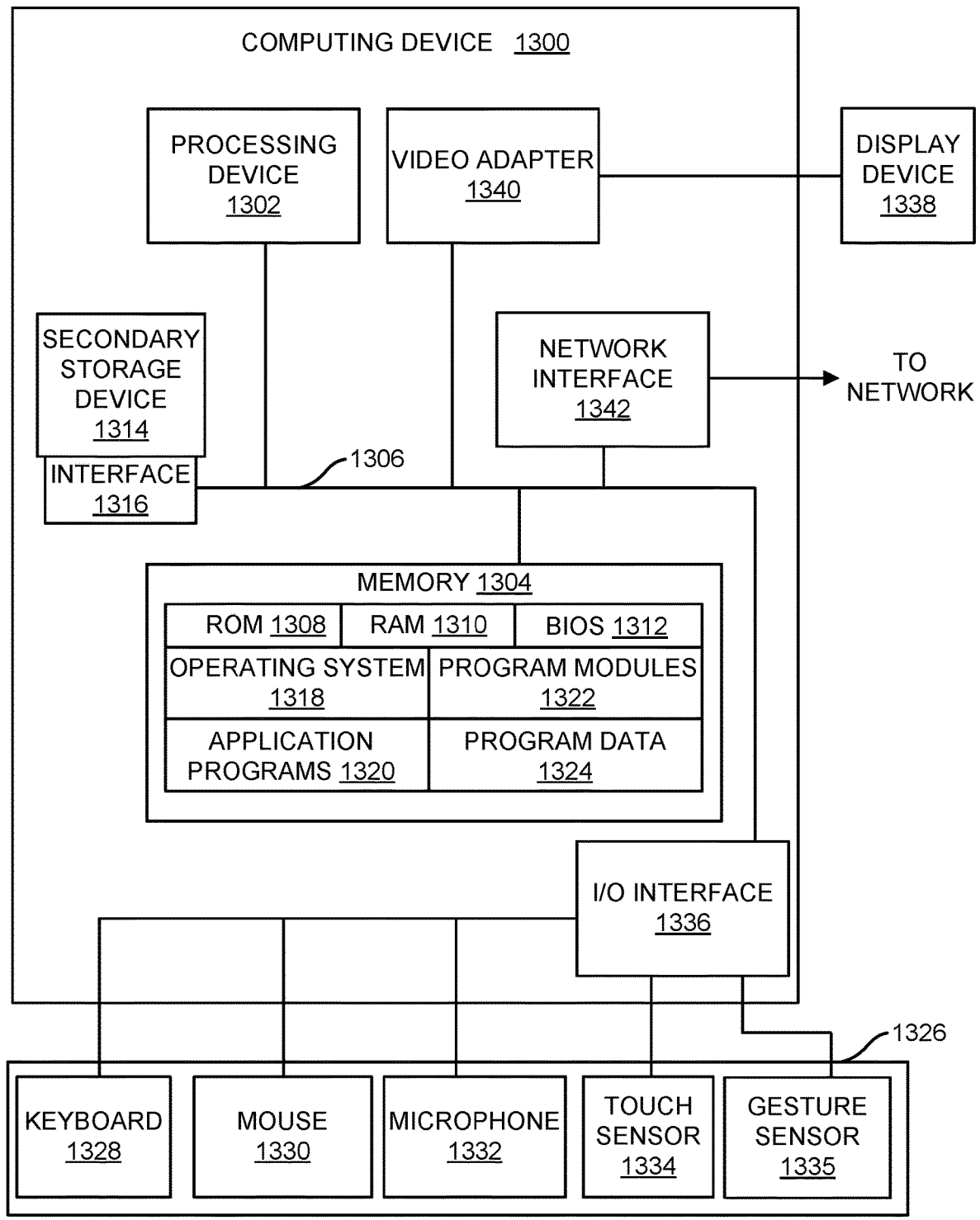
FIG. 13 illustrates an example architecture of a computing device 1300 that can be used to implement aspects of the present disclosure.

FIG. 13 illustrates an example architecture of a computing device 1300 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 13 can be used to execute the operating system, application programs, and/or software modules (including the software engines) described herein.

The computing device 1300 includes, in some embodiments, at least one processing device 1302 (e.g., a processor), such as a central processing unit (CPU). A variety of processing devices are available from a variety of manufacturers, for example, Intel or Advanced Micro Devices. In this example, the computing device 1300 also includes a system memory 1304, and a system bus 1306 that couples various system components including the system memory 1304 to the processing device 1302. The system bus 1306 is one of any number of types of bus structures that can be used, including, but not limited to, a memory bus, or memory controller; a peripheral bus; and a local bus using any of a variety of bus architectures.

Examples of computing devices that can be implemented using the computing device 1300 include a desktop computer, a laptop computer, a tablet computer, a mobile computing device (such as a smart phone, a touchpad mobile digital device, or other mobile devices), or other devices configured to process digital instructions.

The system memory 1304 includes read only memory 1308 and random access memory 1310. A basic input/output system 1312 containing the basic routines that act to transfer information within computing device 1300, such as during start up, can be stored in the read only memory 1308.

The computing device 1300 also includes a secondary storage device 1314 in some embodiments, such as a hard disk drive, for storing digital data. The secondary storage device 1314 is connected to the system bus 1306 by a secondary storage interface 1316. The secondary storage device 1314 and its associated computer readable media provide nonvolatile and non-transitory storage of computer readable instructions (including application programs and program modules), data structures, and other data for the computing device 1300.

Although the example environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 1314 and/or system memory 1304, including an operating system 1318, one or more application programs 1320, other program modules 1322 (such as the software engines described herein), and program data 1324. The computing device 1300 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 1300 through one or more input devices 1326. Examples of input devices 1326 include a keyboard 1328, mouse 1330, microphone 1332 (e.g., for voice and/or other audio input), touch sensor 1334 (such as a touchpad or touch sensitive display), and gesture sensor 1335 (e.g., for gestural input). In some implementations, the input device(s) 1326 provide detection based on presence, proximity, and/or motion. In some implementations, a user may walk into their home, and this may trigger an input into a processing device. For example, the input device(s) 1326 may then facilitate an automated experience for the user. Other embodiments include other input devices 1326. The input devices can be connected to the processing device 1302 through an input/output interface 1336 that is coupled to the system bus 1306. These input devices 1326 can be connected by any number of input/output interfaces, such as a parallel port, serial port, game port, or a universal serial bus. Wireless communication between input devices 1326 and the input/output interface 1336 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 1338, such as a monitor, liquid crystal display device, light-emitting diode display device, projector, or touch sensitive display device, is also connected to the system bus 1306 via an interface, such as a video adapter 1340. In addition to the display device 1338, the computing device 1300 can include various other peripheral devices (not shown), such as speakers or a printer.

The computing device 1300 can be connected to one or more networks through a network interface 1342. The network interface 1342 can provide for wired and/or wireless communication. In some implementations, the network interface 1342 can include one or more antennas for transmitting and/or receiving wireless signals. When used in a local area networking environment or a wide area networking environment (such as the Internet), the network interface 1342 can include an Ethernet interface. Other possible embodiments use other communication devices. For example, some embodiments of the computing device 1300 include a modem for communicating across the network.

The computing device 1300 can include at least some form of computer readable media. Computer readable media includes any available media that can be accessed by the computing device 1300. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 1300.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 13 is also an example of programmable electronics, which may include one or more such computing devices, and when multiple computing devices are included, such computing devices can be coupled together with a suitable data communication network so as to collectively perform the various functions, methods, or operations disclosed herein.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method comprising:
   detecting, by an assisted-driving system that is currently controlling motion of a first vehicle, a traffic event external to the first vehicle; and
   providing, by the assisted-driving system and in response to detecting the traffic event, confirmation to a passenger in the first vehicle that the assisted-driving system is handling the traffic event, the confirmation including a physical feedback perceptible to the passenger;
   wherein the physical feedback comprises a first braking action with regard to the first vehicle, and wherein the assisted-driving system plans a second braking action in response to detecting the traffic event, and wherein the first braking action precedes the second braking action.

2. The computer-implemented method of claim 1, further comprising performing, by the assisted-driving system, an action that is triggered by the detection of the traffic event, the action performed after providing the confirmation.

3. The computer-implemented method of claim 2, wherein the action comprises performing the second braking action and changing a steering angle of the first vehicle.

4. The computer-implemented method of claim 1, wherein the second braking action is defined for the assisted-driving system to handle the traffic event also without the first braking action being performed, and wherein the first braking action is stronger than the second braking action.

5. The computer-implemented method of claim 4, wherein a first velocity of the first vehicle according to the first braking action being performed eventually equals a second velocity of the first vehicle according to the second braking action being performed.

6. The computer-implemented method of claim 5, wherein after the first and second velocities are equal, the first velocity subsequently is greater than the second velocity.

7. The computer-implemented method of claim 6, wherein after the first velocity is greater than the second velocity, the first and second velocities eventually become equal again.

8. The computer-implemented method of claim 1, wherein the traffic event comprises an object being positioned in a path of the first vehicle, or a second vehicle entering the path of the first vehicle.

9. The computer-implemented method of claim 1, wherein the first braking action is stronger than the second braking action.

10. The computer-implemented method of claim 1, wherein the first vehicle is currently present in a lane, wherein the traffic event comprises that a second vehicle enters the lane ahead of the first vehicle.

11. The computer-implemented method of claim 10, wherein the assisted-driving system begins automatically following the second vehicle.

12. A computer-implemented method comprising:
  detecting, by an assisted-driving system that is currently controlling motion of a first vehicle, a traffic event external to the first vehicle; and
  providing, by the assisted-driving system and in response to detecting the traffic event, confirmation to a passenger in the first vehicle that the assisted-driving system is handling the traffic event, the confirmation including a physical feedback perceptible to the passenger;
  wherein the physical feedback comprises a first change of steering angle with regard to the first vehicle.

13. The computer-implemented method of claim 12, wherein the physical feedback further comprises a second change of steering angle performed immediately after the first change of steering angle, the second change of steering angle substantially opposite to the first change of steering angle.

14. The computer-implemented method of claim 12, wherein the assisted-driving system plans a second change of steering angle in response to detecting the traffic event, and wherein the first change of steering angle precedes, and is greater than, the second change of steering angle.

15. The computer-implemented method of claim 14, wherein a first lateral offset corresponding to the first change of steering angle eventually equals a second lateral offset corresponding to the second change of steering angle.

16. The computer-implemented method of claim 12, wherein the traffic event is detected, and the physical feedback is provided, while the first vehicle is automatically following a second vehicle using the assisted-driving system.

17. A computer-implemented method comprising:
  detecting, by an assisted-driving system that is currently controlling motion of a first vehicle, a traffic event external to the first vehicle; and
  providing, by the assisted-driving system and in response to detecting the traffic event, confirmation to a passenger in the first vehicle that the assisted-driving system is handling the traffic event, the confirmation including a physical feedback perceptible to the passenger;
  wherein the physical feedback comprises increasing a seat belt tension for the passenger.

18. The computer-implemented method of claim 17, wherein the first vehicle includes a seat belt tensioner, wherein the seat belt tensioner is configured to apply an amount of pretension to a seat belt in event of an impact, and also to increase the seat belt tension upon detection of the traffic event.

19. A computer-implemented method comprising:
  detecting, by an assisted-driving system that is currently controlling motion of a first vehicle, a traffic event external to the first vehicle; and
  providing, by the assisted-driving system and in response to detecting the traffic event, confirmation to a passenger in the first vehicle that the assisted-driving system is handling the traffic event, the confirmation including a physical feedback perceptible to the passenger;
  wherein the physical feedback comprises moving a seat for the passenger in the first vehicle.

20. A computer program product tangibly embodied in a non-transitory storage medium, the computer program product including instructions that when executed cause a processor to perform operations, the operations comprising:
  detecting, by an assisted-driving system that is currently controlling motion of a first vehicle, a traffic event external to the first vehicle; and
  providing, by the assisted-driving system and in response to detecting the traffic event, confirmation to a passenger in the first vehicle that the assisted-driving system is handling the traffic event, the confirmation including a physical feedback perceptible to the passenger;
  wherein the physical feedback comprises a first braking action with regard to the first vehicle, and wherein the assisted-driving system plans a second braking action in response to detecting the traffic event, and wherein the first braking action precedes the second braking action.

* * * * *